United States Patent
Cho

(10) Patent No.: US 7,782,601 B2
(45) Date of Patent: Aug. 24, 2010

(54) SUPPORT FRAME FOR DISPLAY AND SUPPORT STRUCTURE FOR DISPLAY HAVING THE SAME

(75) Inventor: Jae-Man Cho, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/032,297

(22) Filed: Feb. 15, 2008

(65) Prior Publication Data

US 2008/0225470 A1 Sep. 18, 2008

(30) Foreign Application Priority Data

Mar. 15, 2007 (KR) ...................... 10-2007-0025628

(51) Int. Cl.
*G06F 1/16* (2006.01)
*H01L 35/00* (2006.01)
*H04M 1/00* (2006.01)
*H04B 1/38* (2006.01)

(52) U.S. Cl. ............................. 361/679.21; 361/679.55; 343/700 R; 455/556.1; 455/562.1; 455/575.7; 455/575.8; 455/566; 455/90.3

(58) Field of Classification Search ......... 361/679–686, 361/724–727; 343/702, 700 MS, 700 R, 343/725–727, 846; 455/556.1, 556.2, 562.1, 455/575.7, 575.8, 557–559, 550.1, 575.3, 455/575.4, 90.3, 566; 349/58
See application file for complete search history.

(56) References Cited

U.S. PATENT DOCUMENTS

| 2002/0123375 A1* | 9/2002 | Shimazaki et al. | 455/575 |
| 2004/0209646 A1* | 10/2004 | Murayama et al. | 455/556.1 |
| 2005/0047067 A1* | 3/2005 | Bang et al. | 361/681 |
| 2007/0053144 A1* | 3/2007 | Nakatani et al. | 361/680 |

* cited by examiner

*Primary Examiner*—Jayprakash N Gandhi
*Assistant Examiner*—Nidhi Desai
(74) *Attorney, Agent, or Firm*—Birch, Stewart, Kolasch & Birch, LLP

(57) ABSTRACT

The present invention relates to a support frame for a display and a support structure for a display having the support frame. A support frame for a display of the present invention comprises a seating portion 42 seated on a bottom surface of a case 36; a connection portion 45 extending perpendicularly from the seating portion 42 and having an insertion hole 47 into which an antenna 60 is inserted; and a fastening portion 48 extending perpendicularly from the connection portion 45 and supported by one side of the case 36. According to the present invention so configured, it is possible to increase the strength of the support frame and thus protect a liquid crystal display panel more effectively by means of the reinforcing rib 50 and the escape portion 49 provided in the support frame, and also to improve a radio wave reception rate of the antenna 60.

17 Claims, 8 Drawing Sheets

SUPPORT FRAME FOR DISPLAY AND SUPPORT STRUCTURE FOR DISPLAY HAVING THE SAME

BACKGROUND OF THE INVENTION

1. Field of the Invention

The present invention relates to a portable electronic device, and more particularly, to a support frame for supporting a display of a portable electronic device with an antenna, and a support structure for a display having the support frame.

2. Description of the Related Art

Recently, a variety of portable electronic devices such as a portable computer provided with an antenna for receiving wireless Internet or digital multimedia broadcasting (DMB) are put into the market. Such a portable electronic device is generally provided with a liquid crystal display (LCD). In case of a device, such as a portable computer, which has a relatively large volume and has such an LCD occupying a large region, there is provided an additional frame for protecting the LCD.

Also, a portable electronic device includes an antenna therein to access the wireless Internet or receive DMB. The antenna generally includes a film antenna of a flat shape. This antenna serves to receive a radio wave from the outside and transmit it into the electronic device, so that a reception rate of the antenna is very important. That is, the antenna should be kept in a good reception state.

However, the above prior art has the following problems. Generally, the frame is made of a metal material with a high strength in order to protect the LCD. At this time, if the antenna is mounted near the LCD, a radio wave reception rate of the antenna is deteriorated due to the frame. It is because the frame made of metal interferes with the reception or transmission of a radio wave.

To solve this problem, it may be proposed that the frame is divided into two parts spaced apart from each other such that the antenna is mounted in the space therebetween. However, in such a case, the frame cannot provide its fundamental function of reinforcing the LCD. It is the reason why the LCD cannot be reinforced at the spaced region of the frame.

SUMMARY OF THE INVENTION

Accordingly, the present invention is conceived to solve the aforementioned problems in the prior art. An object of the present invention is to reinforce a display and at the same time to improve a reception rate of an antenna According to an aspect of the present invention for achieving the objects, there is provided a support frame for a display comprising: a seating portion seated on a bottom surface of a case; a connection portion extending perpendicularly from the seating portion and having an insertion hole, the insertion hole allowing an antenna to be inserted thereinto; and a fastening portion extending perpendicularly from the connection portion and supported by one side of the case.

The fastening portion may be formed with an escape portion so that the antenna is exposed. A reinforcing rib may be provided between the insertion hole and the escape portion along a lengthwise direction of the support frame. The support frame may have a cross section of a reverse "L" shape. The fastening portion may extend in a direction opposite to the direction in which the seating portion extends from the connection portion.

A connection terminal may be formed to protrude from the seating portion, the connection terminal being connected to a base plate mounted to the case.

According to another aspect of the present invention, there is provided a support structure for a display comprising: a case; a base plate mounted to the case and allowing a liquid crystal display panel to be seated thereon; and a support frame connected to the base plate and mounted to the case to support the liquid crystal display panel by being coupled therewith, the support frame having an escape portion formed therein by opening a side of the support frame.

The support frame may include a seating portion seated on a bottom surface of the case; a connection portion extending perpendicularly from the seating portion to support one end of the liquid crystal display panel, the connection portion having the insertion hole into which the antenna is inserted; and a fastening portion extending perpendicularly from the connection portion and supported by one side of the case.

The fastening portion may be formed with the escape portion so that the antenna is exposed.

A connection terminal may be formed to protrude from the seating portion and connected to the base plate.

A reinforcing rib may be provided between the insertion hole and the escape portion along a lengthwise direction of the support frame.

According to the present invention configured as above, it is possible to increase the strength of the support frame and thus protect a liquid crystal display panel more effectively by means of the reinforcing rib and the escape portion provided in the support frame, and also to improve a radio wave reception rate of the antenna.

BRIEF DESCRIPTION OF THE DRAWINGS

The above and other objects, features and advantages of the embodiments as broadly described therein will become more apparent from the following detailed description taken in conjunction with the drawings, in which.

DESCRIPTION OF THE PREFERRED EMBODIMENT

Hereinafter, a preferred embodiment of the present invention will be described in detail with reference to the accompanying drawings.

Figure 1:
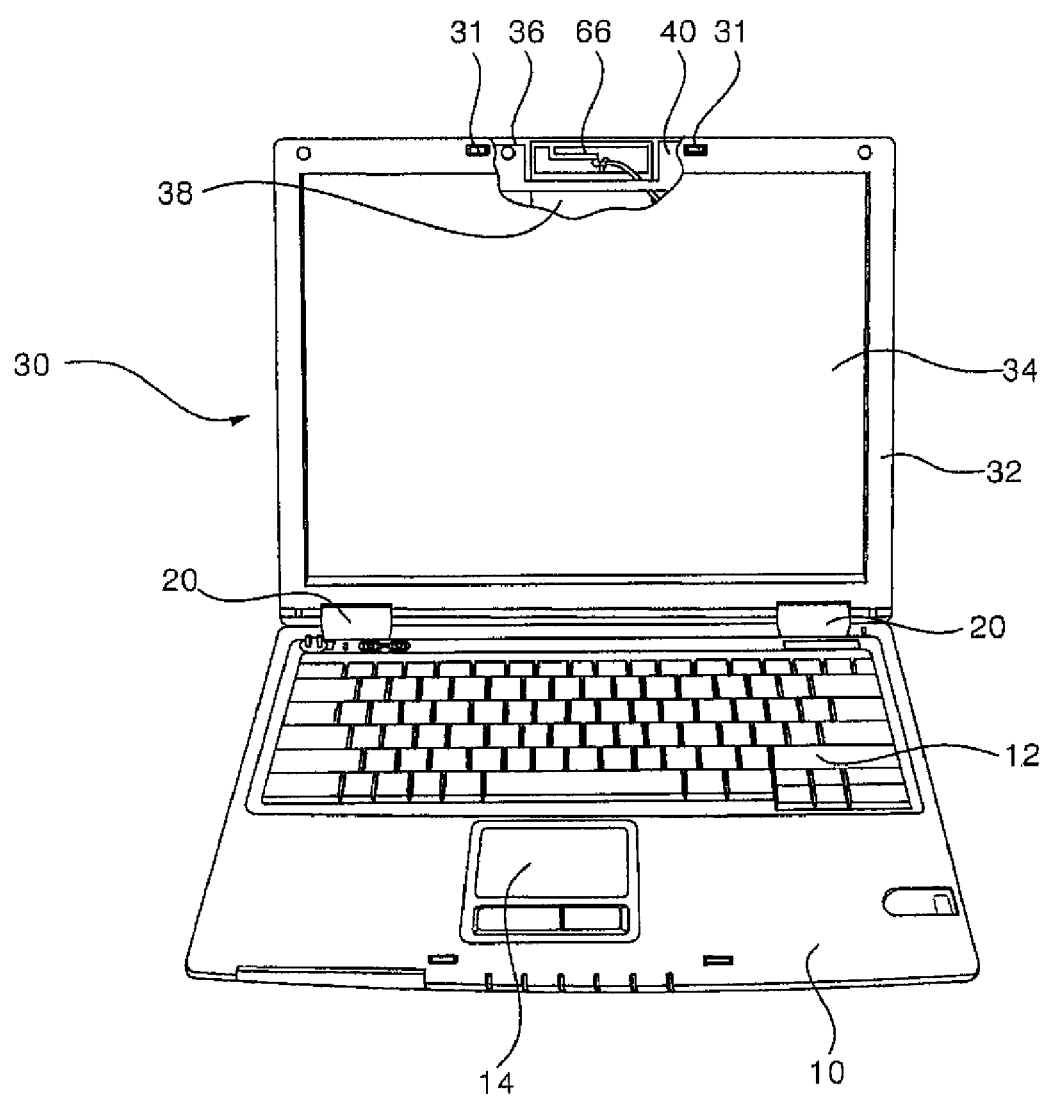
FIG. 1 is a partially sectioned perspective view showing a portable computer to which a support frame for a display according to the present invention is applied.
Figure 2:
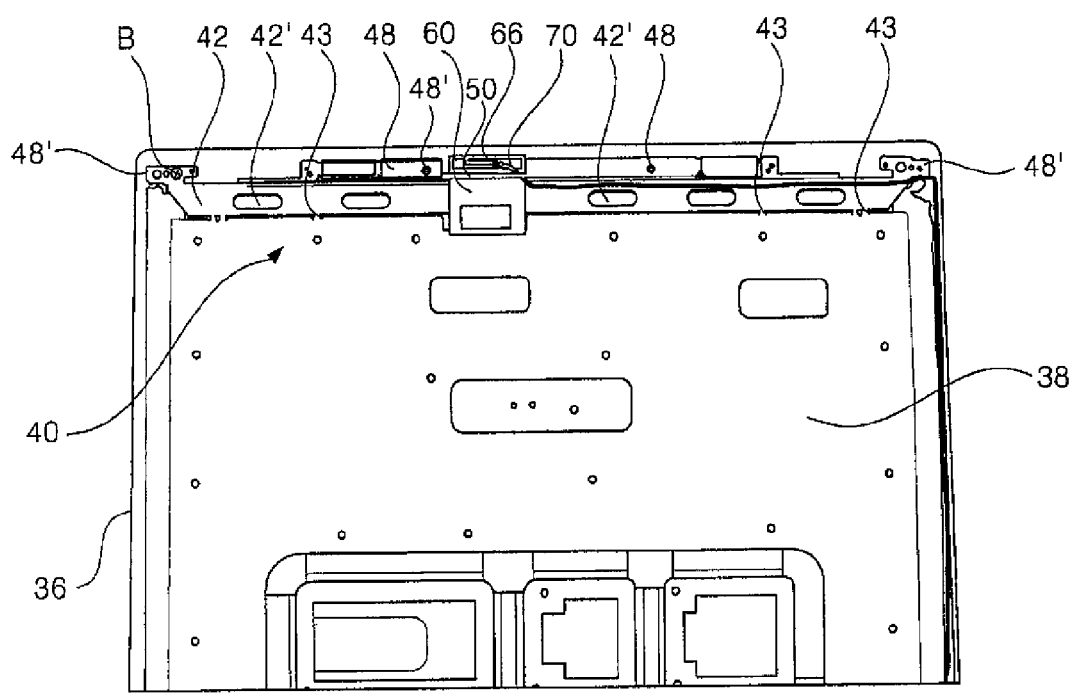
FIG. 2 is a front view showing an interior of a portable computer to which a support structure for a display according to the present invention is applied.
Figure 3:
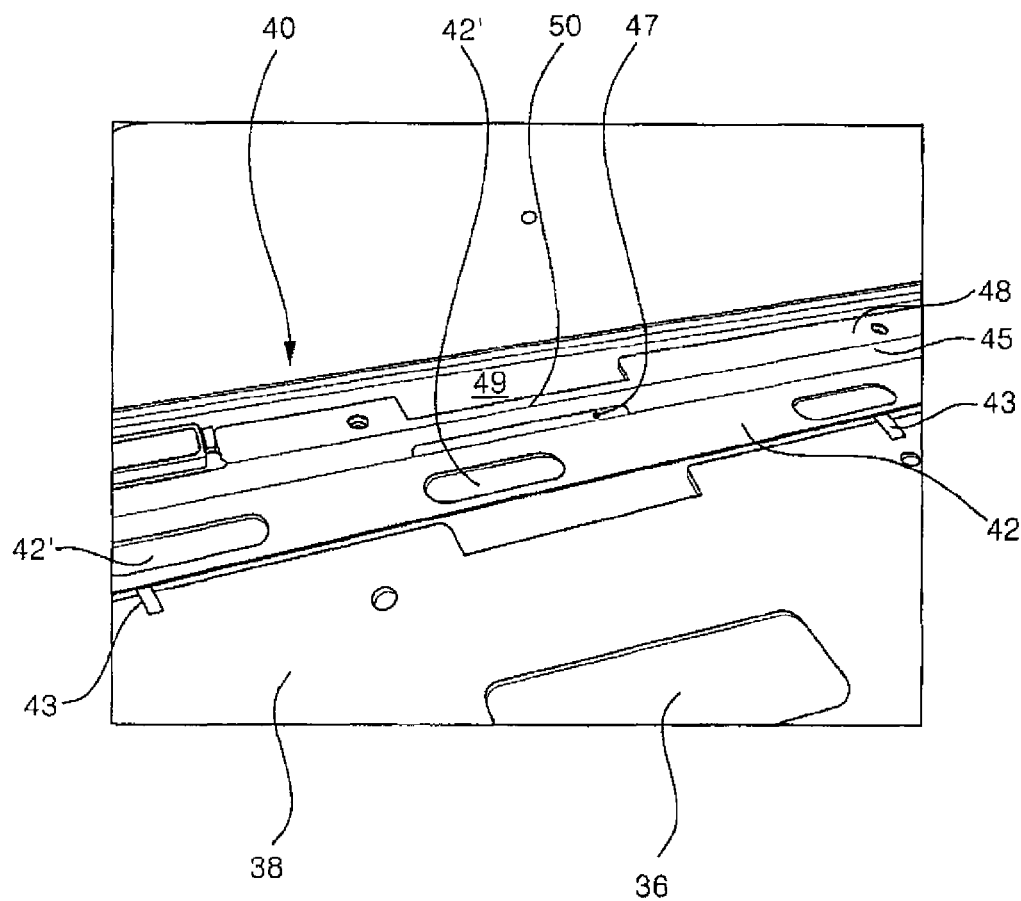
FIG. 3 is a perspective view showing a major portion of a case and a support frame provided therein according to the present invention.
Figure 4:
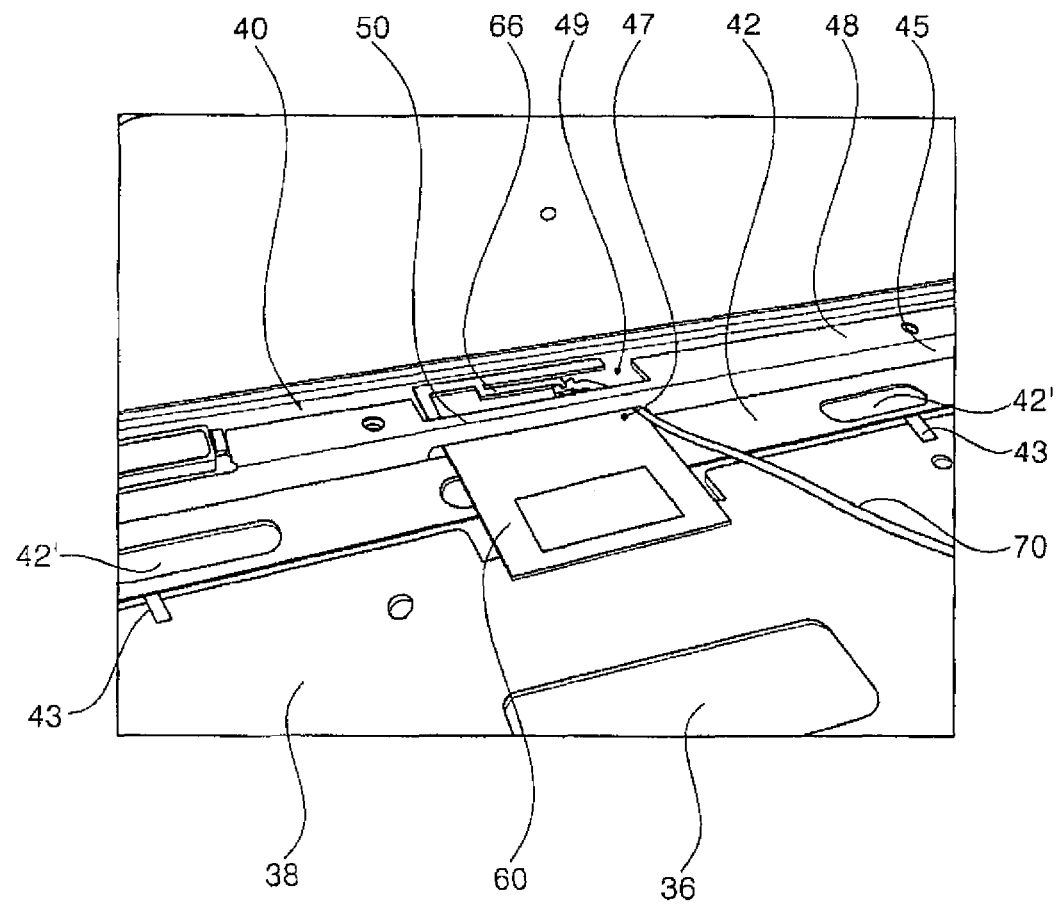
FIG. 4 is a perspective view showing a major portion in which an antenna is coupled to the support structure for a display according to the present invention.
Figure 5:
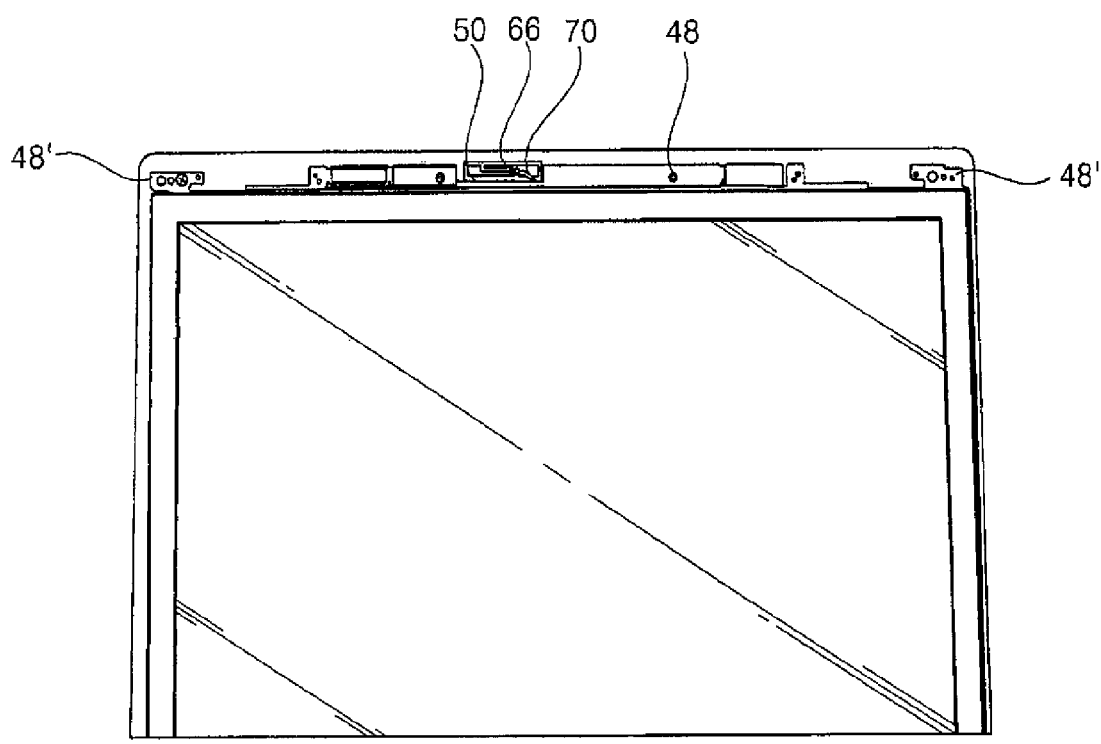
FIG. 5 is a perspective view showing a major portion in which a liquid crystal display panel is coupled to the support structure according to the present invention.

FIG. 1 is a partially sectioned perspective view showing a portable computer to which a support frame for a display according to the present invention is applied, FIG. 2 is a front view showing an interior of a portable computer to which a support structure for a display according to the present invention is applied, FIG. 3 is a perspective view showing a major portion of a case and a support frame provided therein according to the present invention, FIG. 4 is a perspective view showing a major portion in which an antenna is coupled to the support structure for a display according to the present invention, and FIG. 5 is a perspective view showing a major portion in which a liquid crystal display panel is coupled to the support structure according to the present invention.

According to the figures, a main body 10 has a generally flat hexahedral shape, and a keyboard 12 is provided on a rear end of an upper surface of the main body 10. A touchpad 14 is provided on a front end of the upper surface of the main body 10. A variety of parts, including a main board, of the portable computer are installed in the main body 10.

Hinges 20 are provided at both sides of a rear end of the main body 10, and a display 30 is pivotally connected to the main body 10 through the hinges 20. The display 30 is folded on the upper surface of the main body 10 or unfolded at a predetermined angle.

An external appearance of the display 30 is defined by a front case 32 and a rear case 36. The rear case 36 defines a rear side external appearance of the display 30, and the front case 32 defines a front edge external appearance of the display 30. In FIG. 1, it is shown that the front case 32 is partially cut away at a portion to which a support frame 40 and an antenna 60 to be described later are installed.

The display 30 is provided with a liquid crystal display panel 34. The liquid crystal display panel 34, which is to display various kinds of information, is installed inside the display 30 so that most of the liquid crystal display panel 34, except its edges, is exposed through the front face of the display 30. The edges of the liquid crystal display panel 34 are shielded by the front case 32.

A base plate 38 is provided on an inner surface of the rear case 36. The base plate 38 is a region in which the liquid crystal display panel 34 is seated, and serves to protect the liquid crystal display panel 34. That is, the base plate 38 is positioned between the rear case 36 and the liquid crystal display panel 34 to support a rear surface of the liquid crystal display panel 34, thereby reinforcing the liquid crystal display panel 34. The base plate 38 is made of a metal material. At this time, the base plate 38 also functions as a ground by being connected with connection terminals 43, which will be described later.

A support frame 40 is provided on the inner surface of the rear case 36. That is, referring to FIG. 2, the support frame 40 is provided to extend along an upper end of the rear case 36. The support frame 40 supports an upper end of the liquid crystal display panel 34 and thus serves to reinforce the liquid crystal display panel 34. The support frame 40 is made by pressing a metal plate.

The support frame 40 is formed with a seating portion 42 which is seated on the rear case 36. The seating portion 42 is formed to extend longitudinally with a predetermined width. The seating portion 42 is a portion which is fixed to the rear case 36. At this time, a plurality of weight reduction holes 42' are formed in the seating portion 42 to be spaced apart from each other at regular intervals in its longitudinal direction.

The seating portion 42 is formed with the connection terminals 43. The connection terminal 43 is formed to protrude from the seating portion 42 toward the base plate 38. The connection terminal 43 is seated on the upper surface of the base plate 38 and electrically connected with the base plate 38, thereby serving to disperse electromagnetic waves generated from the display 30.

As shown in FIG. 3, a connection portion 45 is formed to be perpendicular to the seating portion 42 along a side end of the seating portion 42. Like the seating portion 42, the connection portion 45 is formed to extend in a lengthwise direction of the support frame 40 with a predetermined width. An upper edge of the liquid crystal display panel 34 is seated on and thus supported by the connection portion 45. Accordingly, the connection portion 45 is formed to extend by a length of the upper end of the liquid crystal display panel 34.

The connection portion 45 is formed with an insertion hole 47. The insertion hole 47 is a portion into which an antenna 60 to be described later is inserted. That is, the insertion hole 47 is open with a size corresponding to a width of the antenna 60 in order to mount the antenna 60 thereto with the support frame 40 mounted to the rear case 36. More specifically, the insertion hole 47 is bored in the connection portion 45 to have a predetermined height from the seating portion 42 and formed in a lengthwise direction of the connection portion 45. At this time, the insertion hole 47 also serves to make it easy for the antenna 60 to receive radio wave together with an escape portion 49 which will be described later.

A fastening portion 48 is formed to extend in a direction perpendicular to the connection portion 45. The fastening portion 48 extends in parallel with the seating portion 42 in a direction opposite to the direction in which the seating portion 42 extends from the connection portion 45. Accordingly, as shown in FIG. 3, a leading end of the fastening portion 48 is supported by one side of the rear case 36, so that the upper end of the liquid crystal display panel 34 is not in direct contact with the rear case 36. In addition, the fastening portion 48 is formed with a plurality of fastening holes 48', so that the support frame 40 can be fastened to the rear case 36 by means of fasteners B.

At this time, as shown in FIG. 2, the fastening portion 48 is formed such that portions thereof are intermittently cut away. This is to secure a space for installing coupling means such as latches 31 for selectively coupling the display 30 to the main body 10.

The fastening portion 48 is partially cut away to define the escape portion 49. The escape portion 49 exposes the antenna 60 from the support frame 40, thereby not interfering with the radio wave reception of the antenna 60. Like the insertion hole 47, the escape portion 49 is formed so that the fastening portion 48 is partially cut away to be open as much as a width of the antenna 60 along the lengthwise direction of the fastening portion 48.

More specifically, the escape portion 49 is concaved by a predetermined length from the leading end of the fastening portion 48. Accordingly, a reception portion 66 of the antenna 60 is not hidden by the support frame 40 but exposed out, thereby improving a reception rate of the antenna 60.

A reinforcing rib 50 is defined between the insertion hole 47 and the escape portion 49. That is, the reinforcing rib 50 is a narrow portion of the fastening portion 45 and the fastening portion 48 and thus has a cross section of a general reverse "L" shape. The reinforcing rib 50 prevents the support frame 40 from being separated at its middle portion for providing the mounting space of the antenna 60. That is, the reinforcing rib 50 makes the support frame 40 be continuous, so that the support frame 40 can support the liquid crystal display panel 34 more securely. At this time, the reinforcing rib 50 is preferably formed integrally with the support frame 40.

As shown in FIG. 2, the rear case 36 is mounted with the antenna 60. In this embodiment, the antenna 60 is a film antenna in the shape of a plate. The antenna 60 is provided with the reception portion 66 to receive a radio wave signal transmitted from the outside. In addition, a wire 70 is connected to the reception portion 66 to transfer the received signal to a main board.

More specifically, the antenna 60 is fixed to the support frame 40 through the insertion hole 47. At this time, the antenna 60 is fixed to the seating portion 42 of the support frame 40 by means of an adhesive. That is, an adhesive is coated on one surface of the antenna 60 facing the seating portion 42, and then the antenna 60 adheres to the support frame 40.

The present invention is not limited to this embodiment. That is, the antenna 60 may also be coupled to the support frame 40 in various ways. For example, the antenna 60 may be coupled to the support frame 40 by means of a double-side tape in order to be easily reattached after its detachment. Alternatively, a coupling means such as a screw may be used so that a specific portion of the antenna 60 is securely fixed to the seating portion 42 of the support frame 40. Also, the antenna 60 may be inserted and fixed between the support frame 40 and the base plate 38. Reference numeral 31 designates a latch.

Hereinafter, the operation of the support frame for a display and the support structure for a display having the support frame according to the present invention, configured as above, will be described in detail.

Figure 6A:
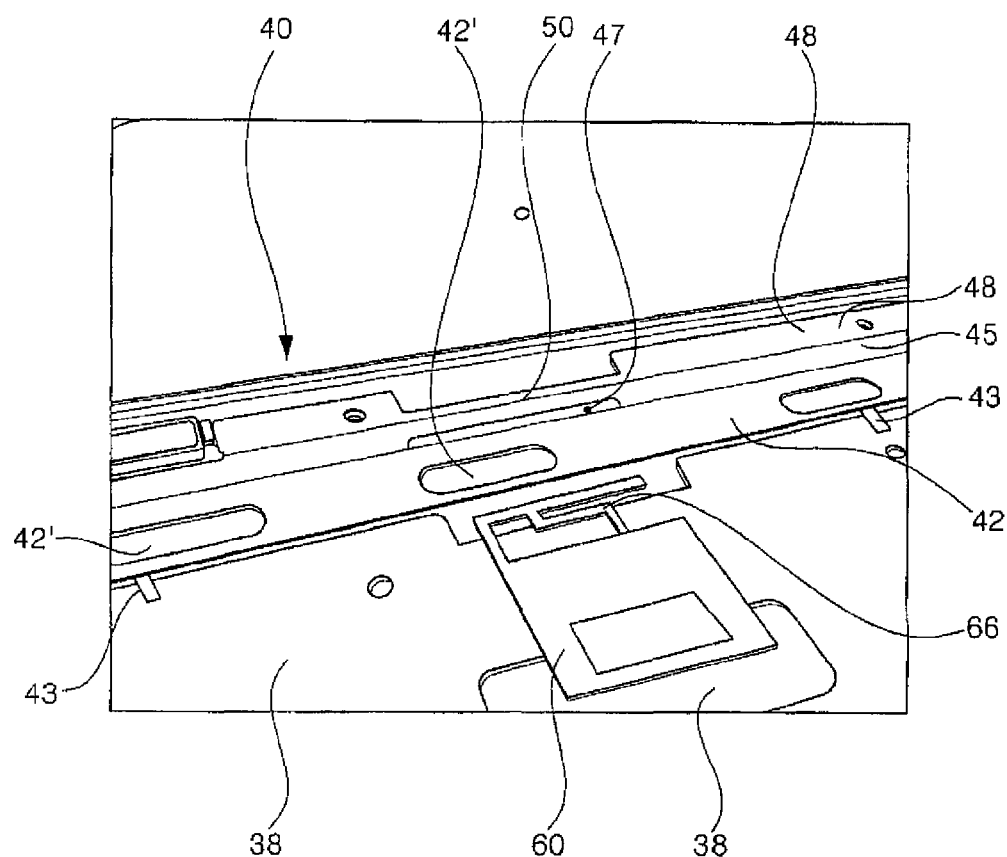
FIGS. 6a to 6c are views showing a process of installing an antenna to the support structure for a display according to the present invention.
Figure 6B:
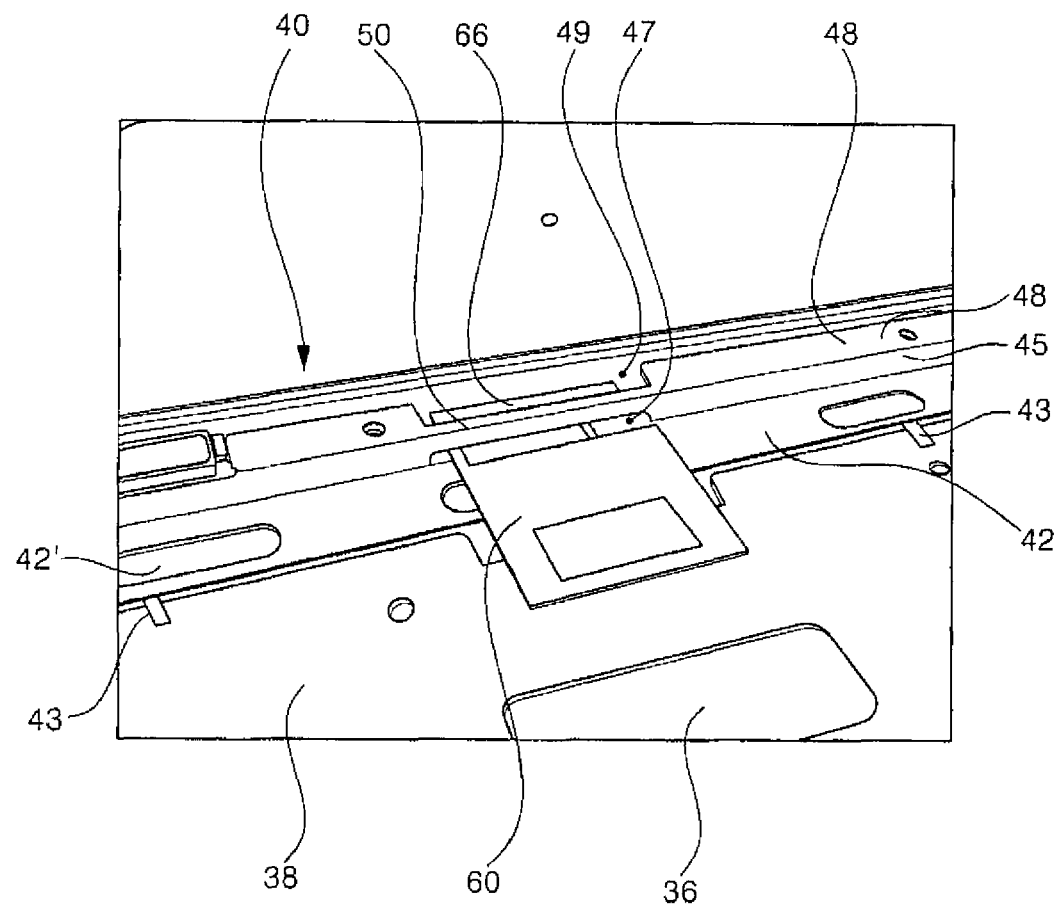
Figure 6C:
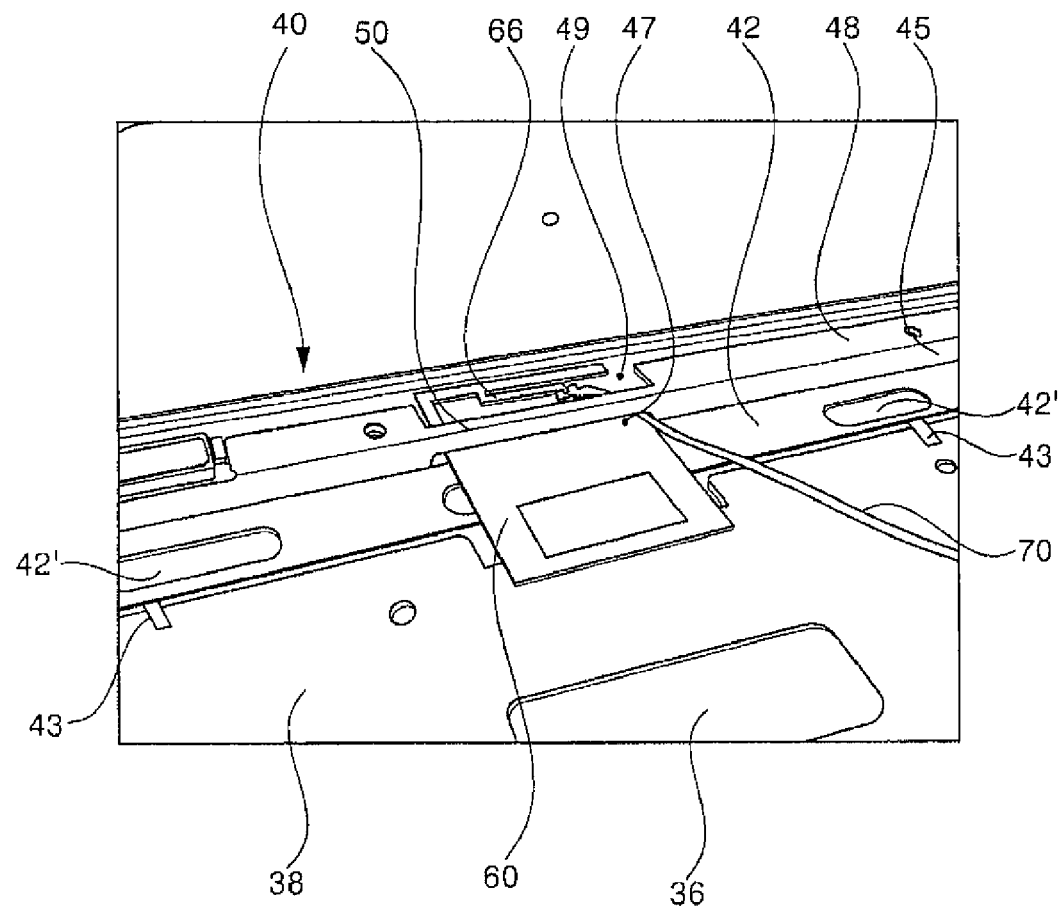

FIGS. 6a to 6c are views showing a process of installing an antenna to the support structure for a display according to the present invention.

Referring to the figures, an assembling process of the liquid crystal display panel 34 will be described. First, the base plate 38 is mounted to the inner surface of the rear case 36. The base plate 38 is fixed to the rear case 36 by means of the fasteners B such as screws.

Then, the support frame 40 is mounted to the upper end of the inner surface of the rear case 36. The support frame 40 is fixed by means of the fasteners B, similarly to the base plate 38. At this time, the connection terminals 43 face the base plate 38, and are seated on the upper surface of the base plate 38. Accordingly, electromagnetic waves generated around the antenna 60 can be dispersed through the base plate 38. Of course, the connection terminal 43 may also be seated on a bottom surface of the base plate 38.

At this time, the seating portion 42 is fixed to the inner surface of the rear case 36, so that the connection portion 45 is installed in the direction perpendicular to the inner surface of the rear case 36. At the same time, the fastening portion 48 is in contact with the upper end of the rear case 36. It is because the fastening portion 48 extends in a different direction than the seating portion 42 does. That is, the seating portion 42 is seated toward the base plate 38, while the fastening portion 48 faces the upper end of the rear case 36.

Then, the antenna 60 is mounted to the rear case 36. The antenna 60 is mounted to the rear case 36 through the insertion hole 47 with the reception portion 66 facing the insertion hole 47. Of course, the antenna 60 may be mounted to the support frame 40. FIG. 6a shows the antenna 60 before it passes through the insertion hole 47.

In this state, a leading end of the antenna 60, i.e., a leading end of the reception portion 66 passes through the insertion hole 47, and the entire antenna 60 is subsequently inserted into the insertion hole 47, which is shown in FIG. 6b.

Thereafter, the leading end of the reception portion 66 of the antenna 60 passes through the insertion hole 47 and then is in contact with and seated on the inner surface of the rear case 36, and at the same time, is in contact with the upper end of the rear case 36. At this time, an adhering means such as a double-side tape or an adhesive is provided on the surface of the antenna 60 facing the rear case 36, so that the antenna 60 is fixed to the rear case 36 or the support frame 40. Of course, the antenna 60 may also be fixed to the rear case 36 or the support frame 40 by means of fasteners such as screws.

At this time, the reception portion 66 is exposed out of the support frame 40 through the escape portion 49. That is, although the antenna 60 is inserted through the insertion hole 47, the reception portion 66 is not shielded by the support frame 40 but exposed through the escape portion 49. Accordingly, the support frame 40 does not interfere with the radio wave reception of the reception portion 66.

In this state, the liquid crystal display panel 34 is mounted to the rear case 36. More specifically, in a state where the rear surface of the liquid crystal display panel 34 is seated on the upper surface of the base plate 38, the liquid crystal display panel 34 and the rear case 36 are coupled to each other by means of fasteners (see FIG. 5).

At this time, a front end of the liquid crystal display panel 34 is positioned to be in contact with the connecting portion 45. Accordingly, the connection portion 45 is spaced apart by a predetermined distance from the upper end of the rear case 36 by the fastening portion 48, so that it is possible to prevent any impact exerted on the upper end of the outer surface of the rear case 36 from being directly transmitted to the liquid crystal display panel 34.

In addition, the upper end of the liquid crystal display panel 34 is supported by the support frame 40. Accordingly, the liquid crystal display panel 34 may be relatively reinforced. In addition, since the support frame 40 is not divided into two parts but continuously formed by the reinforcing rib 50, the liquid crystal display panel 34 can be more effectively protected.

In particular, the reinforcing rib 50 is formed between the insertion hole 47 and the escape portion 49, so that the reinforcing rib 50 has a cross section of a reverse "L" shape. Thus, the reinforcing rib 50 can reinforce the liquid crystal display panel 34 more firmly, rather than a reinforcing rib having a simple plane shape.

Finally, the front case 32 is coupled with the rear case 36.

As set forth before, the support frame for a display and the support structure for a display having the same as embodied and broadly described herein have the following effects.

A support frame according to the present invention is provided with a reinforcing rib, so that the support frame is not divided in tow parts but continuously formed so as to form a mounting space of an antenna. Thus, since the support frame has a relatively increased strength, a liquid crystal display panel may be more effectively protected, thereby enhancing durability of a display.

In addition, an escape portion is formed in the support frame according to the present invention, and a reception portion of the antenna is exposed through the escape portion. Thus, the support frame does not interfere with the radio wave reception of the antenna, thereby improving a radio wave reception rate of the antenna.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

For example, the support frame 40 is not provided only to protect the liquid crystal display panel 34, but may also serve to protect various parts provided in the portable electronic device. In addition, the support frame 40 need not be positioned at the upper end of the rear case 36, but may be mounted to both sides or a lower end of the case 36 as necessary.

What is claimed is:

1. A support frame for a display, comprising:
   a seating portion seated on a bottom surface of a case;
   a connection portion extending perpendicularly from the seating portion and having an insertion hole, the insertion hole allowing an antenna to be inserted thereinto, the insertion hole bored in the connection portion to have a predetermined height from the seating portion; and
   a fastening portion extending perpendicularly from the connection portion and supported by one side of the case,
   wherein the fastening portion is formed with an escape portion so that the antenna is exposed, the escape portion being concaved by a predetermined length from the leading end of the fastening portion, and
   wherein a reinforcing rib is provided between the insertion hole of the connection portion and the escape portion of the fastening portion along a lengthwise direction of the support frame and the reinforcing rib is bent to have a cross section of a reverse "L" shape so that the support frame is integrally formed.

2. The support frame as claimed in claim 1, wherein the escape portion is formed along a lengthwise direction of the fastening portion and has a width corresponding to the antenna.

3. The support frame as claimed in claim 2, wherein the fastening portion is partially cut away, whereby the escape portion is defined.

4. The support frame as claimed in claim 3, wherein the fastening portion extends in a direction opposite to the direction in which the seating portion extends from the connection portion.

5. The support frame as claimed in claim 4, wherein the fastening portion has a fastening hole to be fixed to the case by means of a fastener.

6. The support frame as claimed in claim 5, wherein the insertion hole is formed along a lengthwise direction of the connection portion and has a width corresponding to the antenna.

7. The support frame as claimed in claim 1, wherein a connection terminal is formed to protrude from the seating portion, the connection terminal being electrically connected to a base plate mounted to the case.

8. A support structure for a display, comprising:
   a case;
   a liquid crystal display panel seated on the case; and
   a support frame coupled with an upper end of the liquid crystal display panel and mounted to the case to support the liquid crystal display panel, the support frame having an insertion hole formed therein by opening one side of the support frame, the insertion hole allowing an antenna to be inserted thereinto,
   wherein the support frame includes a seating portion seated on a bottom surface of the case;
   a connection portion extending perpendicularly from the seating portion to support one end of the liquid crystal display panel, the connection portion having the insertion hole into which the antenna is inserted, the insertion hole bored in the connection portion to have a predetermined height from the seating portion; and
   a fastening portion extending perpendicularly from the connection portion and supported by one side of the case,
   wherein the fastening portion is formed with an escape portion so that the antenna is exposed, the escape portion being concaved by a predetermined length from the leading end of the fastening portion, and
   wherein a reinforcing rib is provided between the insertion hole of the connection portion and the escape portion of the fastening portion along a lengthwise direction of the support frame and the reinforcing rib is bent to have a cross section of a reverse "L" shape so that the support frame is integrally formed.

9. The support structure as claimed in claim 8, wherein the case is provided with a base plate on which the liquid crystal display panel is seated.

10. The support structure as claimed in claim 8, wherein the antenna is fixed to the support frame by means of an adhesive.

11. The support structure as claimed in claim 8, wherein the antenna is fixed to the support frame by means of a double-side tape.

12. The support structure as claimed in claim 8, wherein the antenna is inserted and fixed between the support frame and the base plate.

13. The support structure as claimed in claim 8, wherein a connection terminal is formed to protrude from the seating portion and connected to the base plate.

14. The support structure as claimed in claim 8, wherein the case includes a rear case and a front case, and the base plate and the support frame are provided in the rear case.

15. The support frame as claimed in claim 8, wherein a connection terminal is formed to protrude from the seating portion, the connection terminal being electrically connected to a base plate mounted to the case.

16. A support frame for a display, comprising:
    a seating portion seated on a bottom surface of a case;
    a connection portion extending outwardly from the seating portion, the connection portion connected to the seating portion along a first edge;
    an insertion hole formed in the connection portion allowing an antenna to pass through the connection portion;
    a fastening portion extending from a second edge of connection portion; and
    an escape portion formed in a free edge of the fastening portion, the escape portion allowing an antenna to be exposed,
    wherein a reinforcing rib is provided between the insertion hole of the connection portion and the escape portion of the fastening portion along a lengthwise direction of the support frame and the reinforcing rib is bent to have a cross section of a reverse "L" shape.

17. The support frame as claimed in claim 16, wherein the fastening portion is perpendicular to the connection portion.

* * * * *